(12) United States Patent
Michail et al.

(10) Patent No.: US 11,146,777 B2
(45) Date of Patent: Oct. 12, 2021

(54) EFFICIENT IMAGE POPULATION FROM CAPTURED SCENE

(71) Applicant: Microsoft Technology Licensing, LLC, Redmond, WA (US)

(72) Inventors: Ashraf A. Michail, Redmond, WA (US); Yang You, Redmond, WA (US); Michael G. Boulton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 16/276,831

(22) Filed: Feb. 15, 2019

(65) Prior Publication Data

US 2020/0267375 A1 Aug. 20, 2020

(51) Int. Cl.
*H04N 13/282* (2018.01)
*H04N 19/513* (2014.01)
*H04N 13/275* (2018.01)
*G06F 17/16* (2006.01)
*G06K 9/62* (2006.01)
*H04N 13/00* (2018.01)

(52) U.S. Cl.
CPC .......... *H04N 13/282* (2018.05); *G06F 17/16* (2013.01); *G06K 9/6202* (2013.01); *H04N 13/275* (2018.05); *H04N 19/513* (2014.11); *H04N 2013/0085* (2013.01)

(58) Field of Classification Search
CPC .. H04N 13/282; H04N 13/275; H04N 19/513; G06F 17/16
See application file for complete search history.

(56) References Cited

U.S. PATENT DOCUMENTS

| 9,292,953 | B1* | 3/2016 | Wrenninge | G06T 13/60 |
|---|---|---|---|---|
| 9,292,954 | B1* | 3/2016 | Wrenninge | G06T 13/60 |
| 9,311,737 | B1* | 4/2016 | Wrenninge | G06T 13/20 |
| 10,284,794 | B1* | 5/2019 | Francois | H04N 5/3415 |
| 2007/0046686 | A1* | 3/2007 | Keller | G06T 11/001 |
| | | | | 345/581 |

(Continued)

OTHER PUBLICATIONS

"Texture arrays", Retrieved from: https://docs.unity3d.com/2017.1/Documentation/Manual/SL-TextureArrays.html, Oct. 6, 2017, 3 Pages.

(Continued)

*Primary Examiner* — Sarah Lhymn
(74) *Attorney, Agent, or Firm* — Schwvegman Lundberg & Woessner, P.A.

(57) ABSTRACT

A method for efficiently populating a display is provided. The method can include identifying a point at which a world ray intersects a capture surface defined by capture points of a scene, identifying a capture point closest to the identified point, generating a motion vector based on the motion vectors for each of two directly adjacent capture points, identifying a vector in the generated motion vector at a location at which the world ray intersects an image surface, and providing a pixel value from the image data of the capture point, the pixel value corresponding to a location in the image surface at which a vector of the generated motion vector points to the location at which the world ray intersects the image surface within a threshold distance or after a specified number of iterations.

11 Claims, 6 Drawing Sheets

(56) References Cited

U.S. PATENT DOCUMENTS

| | | | |
|---|---|---|---|
| 2014/0104307 A1 | 4/2014 | Tanaka | |
| 2015/0219437 A1* | 8/2015 | Dowski | G05D 1/0278 |
| | | | 701/1 |
| 2016/0045115 A1* | 2/2016 | Chase | A61B 5/0077 |
| | | | 600/476 |
| 2016/0307372 A1 | 10/2016 | Pitts et al. | |
| 2017/0092015 A1 | 3/2017 | Mccann et al. | |
| 2017/0148223 A1 | 5/2017 | Holzer et al. | |
| 2018/0033209 A1 | 2/2018 | Akeley | |
| 2019/0253724 A1* | 8/2019 | Nelson | G06K 9/00771 |
| 2019/0318455 A1* | 10/2019 | Gruen | G06T 15/06 |

OTHER PUBLICATIONS

"Application as Filed in U.S. Appl. No. 15/957,462", filed Apr. 19, 2018, 57 Pages.

Debevec, Paul, "Experimenting with Light Fields", , Mar. 14, 2018, 4 Pages.

Debevec, et al., "Spherical Light Field Environment Capture for Virtual Reality using a Motorized Pan/Tilt Head and Offset Camera Reconstruction", In Proceedings of ACM SIGGRAPH Posters, Aug. 9, 2015, 1 Page.

Jeong, et al., "One Shot 360-Degree Light Field Capture and Reconstruction with Depth Extraction Based on Optical Flow for Light Field Camera", In Journal of Applied Sciences, vol. 8, Issue 6, May 29, 2018, 16 Pages.

Luo, et al., "Parallax360: Stereoscopic 360 Scene Representation for Head-Motion Parallax", In Journal of IEEE Transactions on Visualization and Computer Graphics, vol. 24, Issue 4, Apr. 2018, 9 Pages.

Pollefeys, et al., "From Images to 3D Models", Retrieved from: https://web.archive.org/web/20091105010812/https:/www.inf.ethz.ch/personal/pomarc/pubs/PollefeysCACM02.pdf, Nov. 5, 2009, 7 Pages.

Su, Po-Chang, "Real-Time Capture and Rendering of Physical Scene with an Efficiently Calibrated RGB-D Camera Network Reconstruction", In Dissertation of University of Kentucky, Dec. 10, 2017, 96 Pages.

Surynkova, "Surface Reconstruction", In Proceedings of 18th Annual Conference of Doctoral Students—Contributed Papers, Part I, Jun. 2, 2009, pp. 204-209.

Ichimura, Naoyuki, "Image-Based Rendering by Virtual 1D Cameras", In Proceedings of International Conference on Financial Cryptography and Data Security, Jan. 13, 2009, pp. 423-435.

"International Search Report and Written Opinion Issued in PCT Application No. PCT/US20/015988", dated Apr. 16, 2020, 13 Pages.

* cited by examiner

EFFICIENT IMAGE POPULATION FROM CAPTURED SCENE

BACKGROUND

Virtual reality (VR), augmented reality (AR), and fantasy experiences can be computer-generated, simulated environment experience. These environments can mimic reality or be fantastical. Current generated environments can be provided to a user through a headset. A user wearing the headset can look around, and sometimes even interact with the simulated environment. Current systems are used for training, therapy, education, entertainment, or the like. Current VR systems, when re-synthesizing sparsely captured content, suffer from inaccurate depictions of specularity or reflections. This is due, at least in part, to inefficient image data processing techniques used to generate the images presented to the user.

SUMMARY

This summary section is provided to introduce aspects of embodiments in a simplified form, with further explanation of the aspects of embodiments following in the detailed description. This summary section is not intended to identify essential or required features of the claimed subject matter, and the combination and order of elements listed in this summary section are not intended to provide limitation to the elements of the claimed subject matter.

Generally discussed herein are devices, systems, machine-readable mediums, and methods for efficient display population A virtual reality (VR) system can include a memory device including, for each capture point of capture points of a scene, image data, two directly adjacent capture points, and motion vectors for each of the two directly adjacent capture points, and processing circuitry to perform operations for populating a VR display. The operations can include identifying a point at which a world ray intersects a capture surface defined by the capture points and identifying a capture point closest to the identified point. The operations can include generating a motion vector based on the motion vectors for each of the two directly adjacent capture points, identifying a vector in the generated motion vector at a location at which the world ray intersects an image surface, and providing a pixel value from the image data of the capture point, the pixel value corresponding to a location in the image surface at which a vector of the generated motion vector points to the location at which the world ray intersects the image surface within a threshold distance.

The memory can further include data identifying a cell and an associated capture point identifying the capture point closest to all points in the cell. Identifying the capture point closest to the identified point can include identifying the cell to which the identified point maps and the associated capture point. The motion vectors for the two directly adjacent capture points can form an orthogonal basis.

Providing the pixel value from the image data of the capture point can include identifying a second location corresponding to the identified location minus the identified vector, identifying a second vector of the generated vectors at the second location, determining a difference between the location and a third location to which the second vector points, or comparing the determined difference to a threshold distance and in response to determining the determined difference is less than the specified threshold returning the pixel of the image data corresponding to the second location.

A non-transitory machine-readable medium can include instructions that, when executed by a machine, cause the machine to perform operations comprising identifying a point at which a world ray intersects a capture surface defined by capture points. The operations can further include identifying a capture point closest to the identified point and generating a motion vector based on motion vectors for each of the two directly adjacent capture points. The operations can further include identifying a vector in the generated motion vector at a location at which the world ray intersects an image surface, and providing a pixel value from the image data of the capture point, the pixel value corresponding to a location in the image surface at which a vector of the generated motion vector points to the location at which the world ray intersects the image surface within a threshold distance.

Identifying the capture point closest to the identified point can include identifying the cell to which the identified point maps and the associated capture point. The motion vectors for the two directly adjacent capture points can form an orthogonal basis.

Providing the pixel value from the image data of the capture point can include identifying a second location corresponding to the identified location minus the identified vector, identifying a second vector of the generated vectors at the second location, determining a difference between the location and a third location to which the second vector points, or comparing the determined difference to a threshold distance and in response to determining the determined difference is less than the specified threshold returning the pixel of the image data corresponding to the second location.

A method for populating a virtual reality (VR) headset display can include identifying a point at which a world ray intersects a capture surface defined by capture points of a scene and identifying a capture point closest to the identified point. The method can further include generating a motion vector based on the motion vectors for each of two directly adjacent capture points. The method can further include identifying a vector in the generated motion vector at a location at which the world ray intersects an image surface and providing a pixel value from the image data of the capture point, the pixel value corresponding to a location in the image surface at which a vector of the generated motion vector points to the location at which the world ray intersects the image surface within a threshold distance or after a specified number of iterations.

Identifying the capture point closest to the identified point includes identifying the cell to which the identified point maps and the associated capture point. The motion vectors for the two directly adjacent capture points can form an orthogonal basis.

Providing the pixel value from the image data of the capture point can include identifying a second location corresponding to the identified location minus the identified vector, identifying a second vector of the generated vectors at the second location, determining a difference between the location and a third location to which the second vector points, or comparing the determined difference to a threshold distance and in response to determining the determined difference is less than the specified threshold returning the pixel of the image data corresponding to the second location.

DETAILED DESCRIPTION

Figure 1:
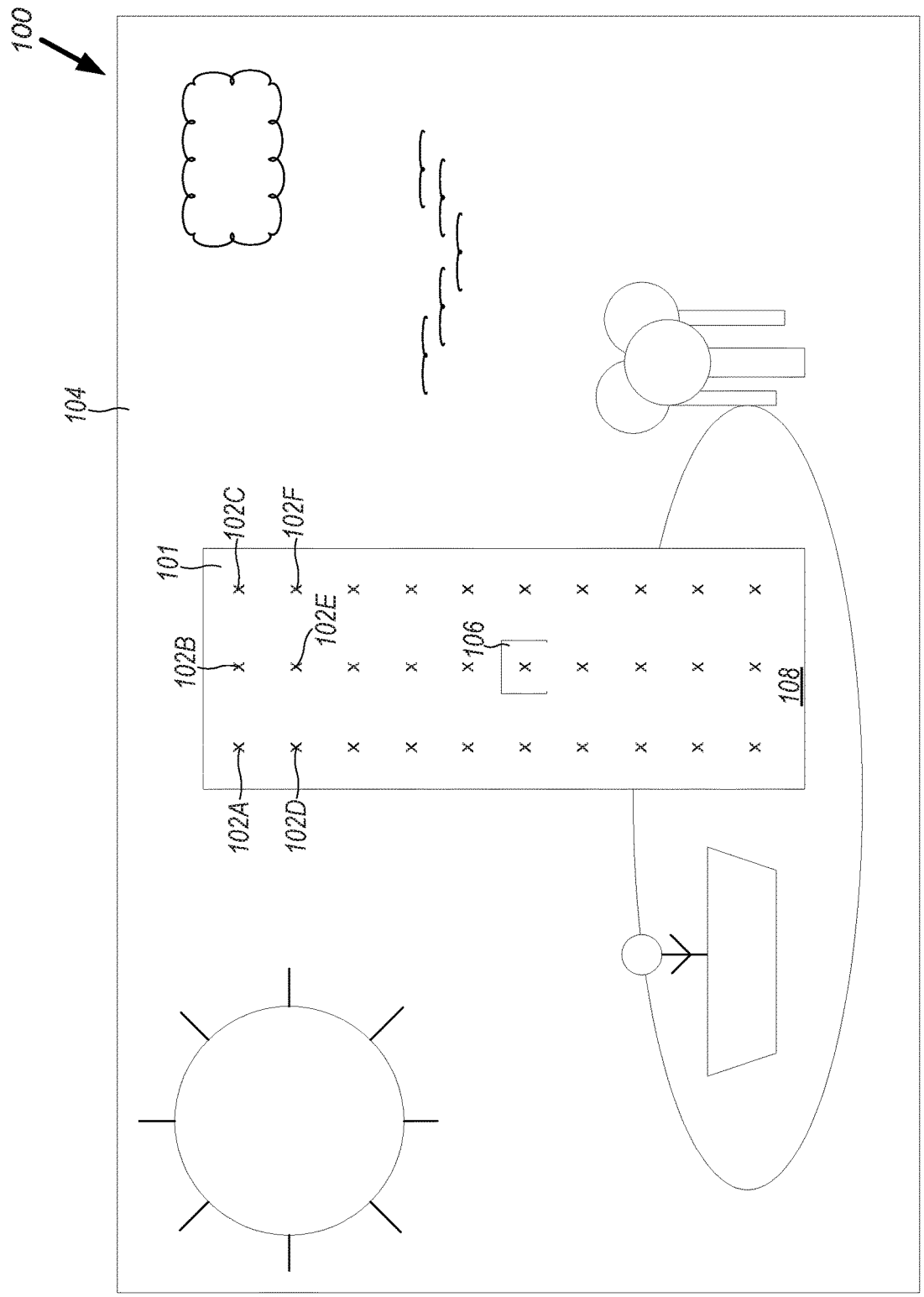
FIG. 1 illustrates, by way of example a logical block diagram of an embodiment of a system for VR image capture.

In the following description, reference is made to the accompanying drawings that form a part hereof. The drawings show, by way of illustration, specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or methods described herein may be implemented in software in some embodiments. The software may include computer executable instructions stored on computer or other machine-readable media or storage device, such as one or more non-transitory memories (e.g., a non-transitory machine-readable media) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuit (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry. Processing circuitry can include electric and/or electronic components. Electric and/or electronic components can include one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like.

In general, red, green, blue (RGB) or other images can be captured using a rig with a planar, spherical, or other shaped capture surface. The images can be captured at regular or irregular intervals in an embodiment with one or more cameras that form only a portion of a capture surface. These images can be processed into a format that supports real-time access and rendering. The formatted data can used by circuitry of a VR headset to reconstruct a highly realistic version of the scene in the field of view of the capture surface. The user of the VR headset can freely move within the view captured by the cameras of the rig. The view can be rendered as if it was rendered from the point of view of the user. Using embodiments, higher-order lighting effects, such as specularity and reflection can be reconstructed.

Example applications include but are not limited to: capturing an area in a desirable location, such as a museum exhibit, a geographic location (e.g., Times Square, or the like), a building, or the like a live view of a conference room or other video conference, or the like. Reconstructing arbitrary points of view within the vicinity of the rig with lighting that mimics reality is important for comfort, realism, and meeting user expectations.

FIG. 1 illustrates, by way of example a diagram of an embodiment of a system 100 for VR image capture. The system 100 includes a capture manifold 101, and a scene 104. The capture manifold 101 is a device that controls a distance between camera capture points 102A, 102B, 102C, 102D, 102E, etc. The capture manifold 101 can include one or more cameras 106. For example, the camera 106 can be moved with respect to the scene 104, such as by a position-controlled motor that moves the camera 106 individually or moves the entire capture manifold 101. Data representing the position of the capture point 102A-102E of an image of the scene 104 can be recorded (relative to other camera capture points). In another example, there is a camera 106 at each capture point 102A-102E, so as to form a camera array. The cameras 106 of the array can be located relative to one another and the locations can be recorded.

The capture manifold 101 includes a capture surface 108. The capture surface 108 can be planar, or non-planar (e.g., elliptical, spherical, oblong, irregular, or the like). The capture surface 108 is a surface defined by the capture points 102A-102F.

The scene 104 can be a static or dynamic scene. For example, in an embodiment in which a camera array is generating images of the scene 104, the scene 104 can be dynamic. In an embodiment in which fewer cameras than capture points are used to capture the scene, the scene 104 can be static. The scene 104 can be of an indoor or outdoor location or natural or manufactured.

The camera(s) 106 can record image data for each capture point 102A-102F. The image data can record the scene 104 from different respective perspectives. The camera(s) 106 can record grayscale, RGB, or other color or non-color intensity values of the scene 104 incident on an optical transducer of the camera(s) 106.

Figure 2:
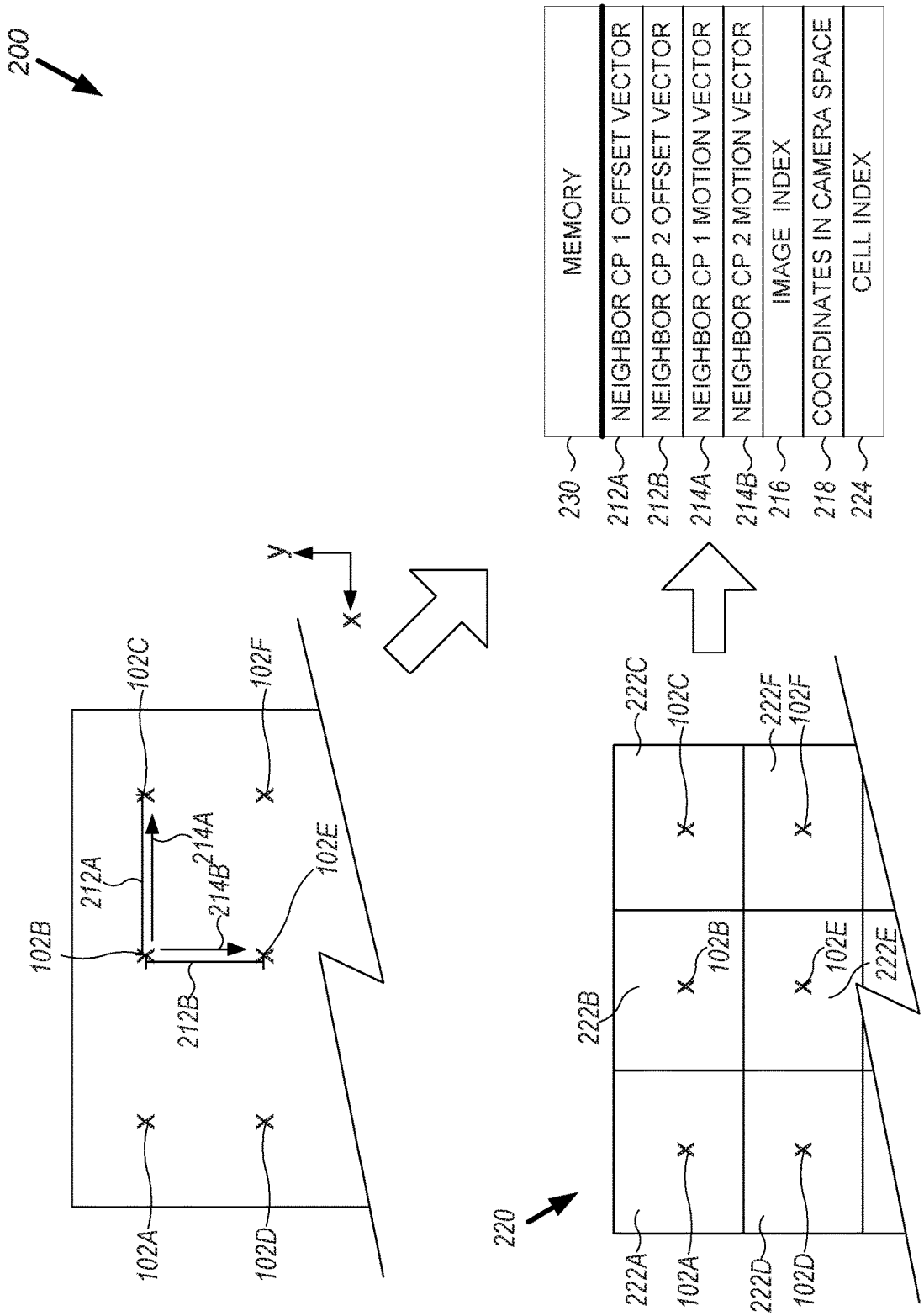
FIG. 2 illustrates, by way of example, a flow diagram of an embodiment of a method for image pre-processing.

FIG. 2 illustrates, by way of example, a diagram of an embodiment of a method 200 for image pre-processing. The method 200 as illustrated includes, for each capture point 102A-102F, identifying two neighboring capture points. The two neighboring capture points are offset from the capture point in space. A-Offset capture point vectors (212A and 212B) pointing from the capture point of interest to a first neighbor capture can be orthogonal (or nearly orthogonal) to a vector pointing to the second neighbor capture point.

Thus, respective motion vectors 214A and 214B between the capture point 102 and its two neighbors can form an orthogonal basis for the capture point 102. For example, in FIG. 2 capture points 102C and 102E are neighbor capture points to capture point 102B. A motion vector 214A between capture point 102B and 102C and a motion vector 214B between capture point 102B and 102E form an orthogonal basis for the capture point 102B.

Note that it may not be possible to identify capture points that are perfectly orthogonal. In such situations, the overlap of the non-orthogonal portions of the motion vectors should be accounted for. This can be done by subtracting a projection of a first motion vector onto a second motion vector from the second motion vector. If the motion vectors are orthogonal, the projected motion vector will be zero in all dimensions.

The motion vectors 214A, 214B are multi-dimensional vectors that indicate an offset (direction and magnitude) from the coordinates in an image of interest to the coordinates in a reference image (or vice versa). The motion vectors 214A and 214B can be generated using H.264 hardware (MPEG-4 Part 10, Advanced Video Coding (MPEG-4 AVC)), an optical flow technique, or the like. in embodiments that include a non-planar capture surface, there can be a rotation between neighboring capture points. This rotation can be removed.

If two adjacent capture points have a mutual rotation (in other words, the camera was (or cameras were) pointed in slightly different directions when it captured each image, as would be the case if the manifold was a sphere), the relative rotation between the corresponding captured images can be removed before generating the motion vectors. Because most motion vector techniques generate lower quality results as mutual rotation is increased, the rotation can be removed. The quality can be lower because it is assumed that the motion between the capture points is mostly lateral translation. By factoring out rotation, a higher quality motion vector field can be obtained. This factored out rotation can then be reapplied elsewhere in the process to produce correct results.

An offset vector 212A, 212B can be determined for each capture point 102 and its two identified neighbor capture points. The offset vector 212A, 212B indicates a direction and magnitude between the capture points 102B and 102C, and 102B and 102E, respectively.

In one or more embodiments, a capture plane or capture surface defined by the capture points 102A, 102B, 102C, 102D, 102E, and 102F can be partitioned into regions based on distance to the capture points 102A, 102B, 102C, 102D, 102E, and 102F. An example of such a partitioning is provided by a grid 220. The partitioning can generate a cell 222A, 222B, 222C, 222D, 222E, and 222F for each of the capture points 102A, 102B, 102C, 102D, 102E, and 102F, such that any point in the cell 222A-222E is closer to the capture point of the cell than any other capture point. The extent of each cell can be determined and recorded in a memory 230. The extent of each cell can be rendered into a texture off-line. This texture can be the same resolution as the color texture captured by the camera. Each element of the texture stores an integer that points to the closest capture point. The extent can include a min and max in each coordinate of the surface or plane that the cell 222 occupies. An example of such a grid is a Voronoi grid.

The memory 230 can include the capture position 218 (e.g., coordinates of the capture point 102B in the capture surface), the neighbor offset capture point vector 212A-212B for each neighbor capture point 102E and 102C, the motion vectors 214A-214B for each neighbor capture points, an image index uniquely identifying the image captured at the capture point 102B, and an optional cell index 224 uniquely indicating the cell 222 for which the capture point 102B is the closest capture point.

The operations of FIG. 2 can be performed before deployment of system 100 incorporating a VR headset to reconstruct a highly realistic version of a scene in the user's field of view. Each capture point 102A, 102B, 1020, 102D, 102E, and 102F can be processed similarly. The data of the images and corresponding vectors, neighbor capture points, and the grid data can be stored in a texture array, such as for convenient access.

Figure 3:
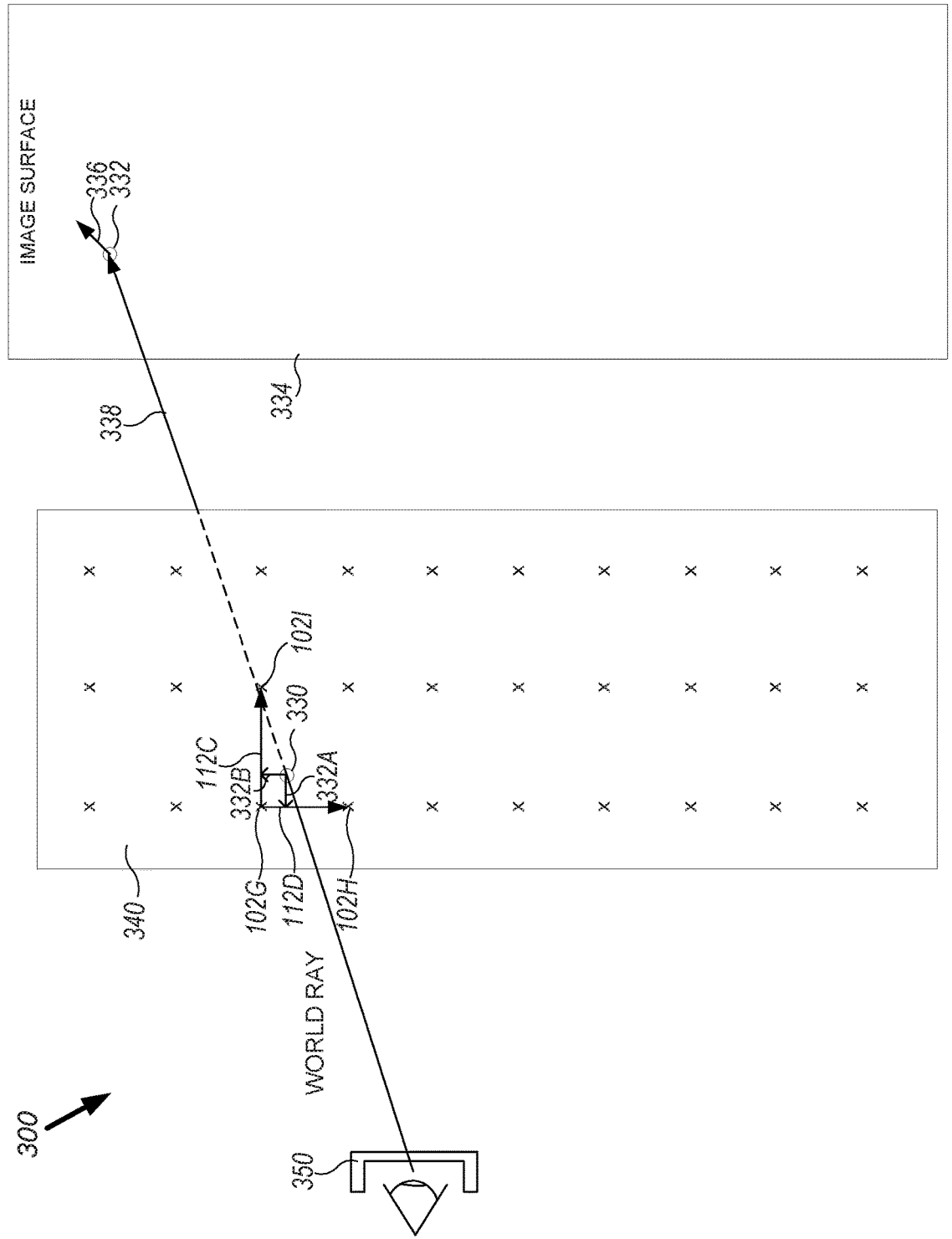
FIG. 3 illustrates, by way of example, a logical block diagram of an embodiment of a portion of a method for identifying a pixel value to display.

FIG. 3 is a diagram illustrating light interaction between a user's eye and an image surface 334. FIG. 3 illustrates, by way of example, a diagram of an embodiment of a portion of a method 300 for identifying a pixel value to display. The method 300 can be performed for each pixel of each display of a VR headset 350. The method 300 as illustrated includes identifying a point 330 at which a world ray 338 intersects a capture surface 340. This point 330 is very unlikely to correspond exactly to a location at which an image was captured (sometimes called a capture point 102G). The method 300, as illustrated, further includes identifying a capture point 102G that is closest to the identified point 330. This can be accomplished by determining which cell 222 of the grid 220 the point 330 falls in. In the example of FIG. 3, the capture point 102G is the closest capture point to the point 330.

The method 300 as illustrated further includes using the motion vector fields 112C, 112D to the neighboring capture points 102H, 102I to estimate a motion vector field representing displacement from the capture point 102G, to an image that was captured at the point 330. The motion vector field can be a linear combination of the two motion vector fields that have been scaled by a factor that is a function of the projected points onto the offset motion vector fields 112C and 112D as indicated at 332A and 332B to the nearest neighbors. The linear combination can include a portion of the motion vectors determined based on a projection of a vector 332A, 332B pointing from the capture point 102G to the point 330 onto respective motion vector fields 112C, 112D pointing from the capture point 102G to the neighboring capture points 102H and 102I.

A field of motion vectors corresponding to the location 332 at which the world ray 338 intersects an image surface 334 can be identified. The image surface is defined by an artificial focal point behind the capture surface (from the perspective of a user of a VR headset).

Figure 4:
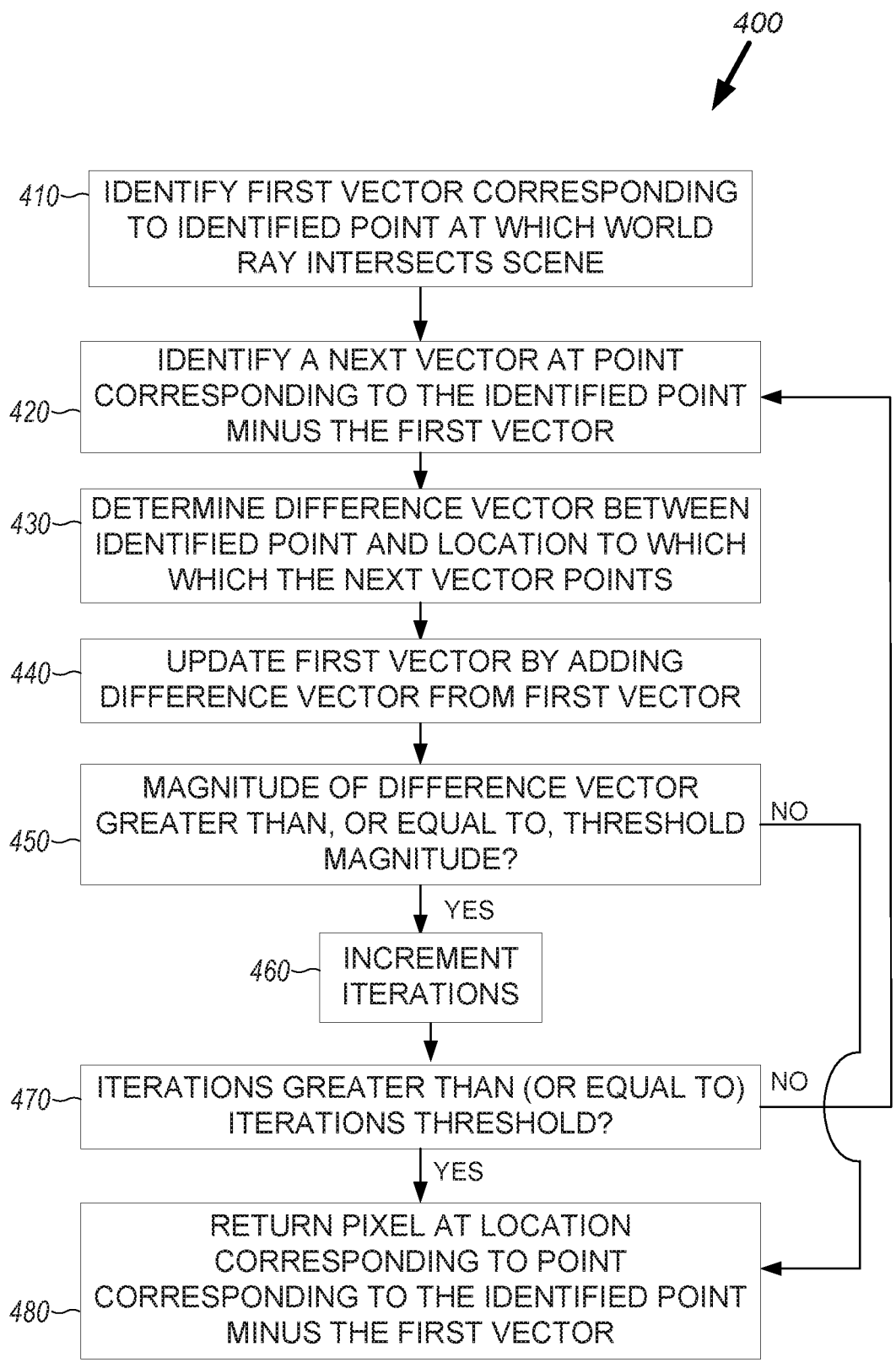
FIG. 4 illustrates, by way of example, a flow diagram of an embodiment of a method for returning a pixel value for display.
Figure 5:
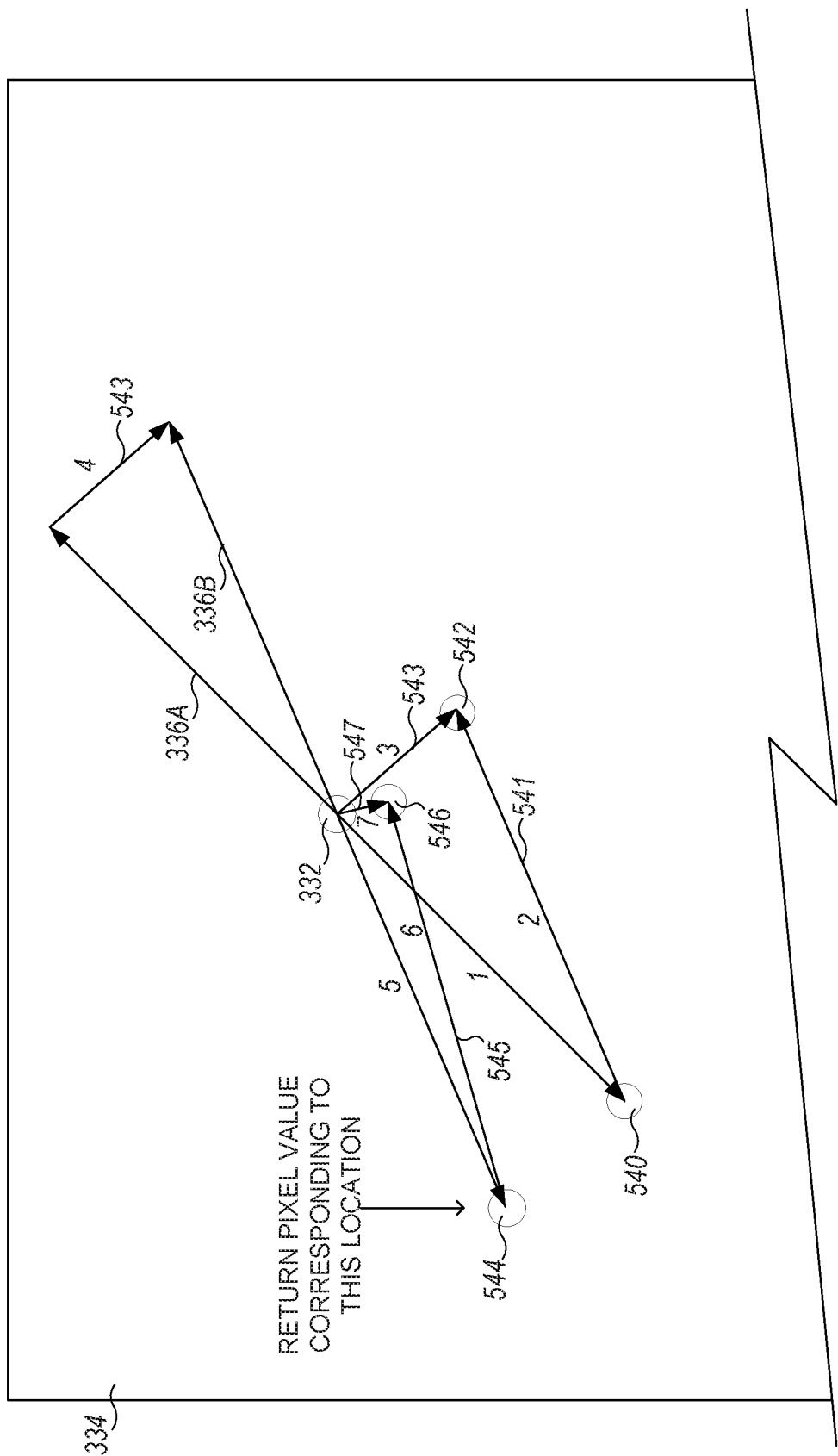
FIG. 5 illustrates, by way of example, a diagram of an embodiment of a portion of the method of FIG. 4.

FIG. 4 illustrates, by way of example, a diagram of an embodiment of a method 400 for returning a pixel value for display at VR headset 350. FIG. 5 illustrates, by way of example, a diagram of an embodiment of vectors and points in the image surface 334. The method 400 is a way of efficiently (in terms of compute time and memory bandwidth) identifying a value for each pixel to be presented to a user, such as through a display of a virtual reality headset, or other display. The method 400 is described with intermittent reference to FIGS. 3 and 5 which provide simple illustrations of portions of the method 400. The method 400 can be performed for each pixel to be returned to the display for each eye in the VR headset 350.

The method 400 as illustrated includes identifying a first vector corresponding to the point 332 at which a world ray intersects an image surface, at operation 410. This operation is illustrated and described in more detail in FIG. 3. The identified point 332 and the motion vector field 336 at that point are illustrated in FIG. 3 and FIG. 5.

At operation 420, a next vector at a point corresponding to the identified point minus the first vector can be identified. In FIG. 5, the numerals "1"-"7" indicate order of operations. At "1", the motion vector field 336 indicated as 336A in FIG. 5 for the point 332, is subtracted from the point 332 to identify point 540. That is, the point 540 corresponds to the point 332 minus the vector 336A. A vector 541 from the point 540 is identified by operation "2". The vector 541 is from the capture point vector fields 212A and 212B generated by combining the neighbor motion vectors.

At operation 430, a difference is determined between the point at which the world ray intersects the image surface and a point to which the next vector points. In FIG. 5, the next vector 541 points to a point 542. A difference vector 543 represents the difference between the identified point 332 and the point 542 to which the next vector 541 points.

At operation 440, the first vector is updated by adding the difference vector determined at operation 430 to the first vector. This is illustrated in FIG. 5 at operation "4" that includes adding the difference vector 543 to the first vector 336A to update to the first vector 336B.

At operation 450, it can be determined whether a magnitude of the difference vector is greater than (or equal to) a threshold magnitude. If the magnitude is greater than (or equal to) the threshold magnitude, an iterations tracking variable is updated at operation 460. If the magnitude is not greater than (or equal to) the threshold magnitude, operation 480 can be performed.

At operation 470, it can be determined whether the iterations tracking variable is greater than (or equal to) an iterations threshold. If the iterations tracking variable is not greater than (or equal to) the iterations threshold, the method 400 can continue to operation 420, If the iterations tracking variable is greater than (or equal to) the iterations threshold, the method 400 can continue to operation 480.

At operation 480, a pixel (from the camera image captured at the capture point closest to the point where the world ray intersects the capture surface) at the point corresponding to the identified point minus the first vector (which is most likely updated) is returned as the value to be displayed to the user at the position corresponding to the world ray.

Said another way, the method 400 is looking for a point in the image surface that has a corresponding vector in the motion vector field that points to the location at which the world ray intersects the image surface. The pixel at that location is returned as the correct value for what is provided to the user for the display. This accounts for reflection and specularity using sparse capture data.

The iterations threshold can be set to cap an amount of compute bandwidth used to identify a pixel location by the method 400. Some motion vectors can have oscillations in which two or more vectors point to each other, thus forming a loop. Some motion vectors can be non-smooth and the method 400 can lead further away from finding the pixel of interest. In general, though, the method 400 will determine a point that has a corresponding vector that points to the point at which the world ray intersects the image surface within a threshold magnitude (e.g., distance). The threshold magnitude can be set to be one or more-pixel widths, or some other number.

The method 400 is merely an example of the operations and order of operations that can be performed to identify a pixel value that accounts for specularity and reflection using sparse capture data. Some of the operations of the method 400 can be performed in a different order. For example, the operations 440, 450, 460, 470 may be performed in a different order than illustrated. In some embodiments, the operation 440 can be performed after one or more of operations 450, 460, or 470. In some embodiments, the operation 450 can be performed after operations 460 or 470. Other changes are possible without straying from the scope of embodiments.

Prior VR solutions fail to provide realistic specularity and reflection depictions using sparse capture data, such as when reconstructing a captured scene from an arbitrary position. For example, consider light reflecting off a table surface and that a VR user is viewing the table surface. Prior VR solutions with sparse capture data fail to realistically depict the changes in the table reflection that are caused by user movement (perspective change). The user expects the reflection to change in real time like it would in reality, but the VR techniques fail in this regard without requiring an excessive amount of memory or processing bandwidth. Embodiments herein solve this problem by identifying the pixel expected by the user based on capture point motion vectors. A pixel at the location of a vector of a distorted motion vector (that estimates movement from a nearest capture point to the world ray intersect) that points to a location at which the world ray intersects the image surface is the proper pixel value to account for the user perspective in viewing the reflection. Embodiments provide techniques, systems, and devices that can identify this pixel value for each display in a VR headset efficiently, such as in real time.

Returning to FIG. 5, the operations 1, 2, 3, correspond to a first iteration of the method 400. The operations 4, 5, 6, and 7 correspond to a second iteration of the method 400. The operation "5" represents subtracting the vector 336B from the identified point 332. A point 544 corresponds to the location that is the result of the that subtraction. A vector 545 from the motion vector at the point 544 is identified. A point 546 to which the vector 545 points is identified. A difference vector 547 between the point 332 and the point 546 can be determined. The magnitude of the difference vector 547 can be compared to the threshold magnitude. If the magnitude is less than (or equal to) the threshold magnitude, the pixel at the point 544 can be returned as the pixel corresponding to the world ray 338.

In the description, a number of normal VR operations are not discussed. For example, one or more transforms of the image that can be performed to adjust for the lens of a VR headset, the assumption that a line of sight is assumed to intersect a center axis of the lens of the VR headset, among others, are not discussed. The embodiments discussed herein are independent of these VR operations and are compatible with such operations. The improvements provided by embodiments speed up pixel selection and account for specularity, reflections, parallax, or the like. Thus, embodiments improve the operation of the VR headset while simultaneously improving the user experience of the VR headset. The user experience is increased by displaying a more realistic specularity and parallax than prior VR image representations.

Figure 6:
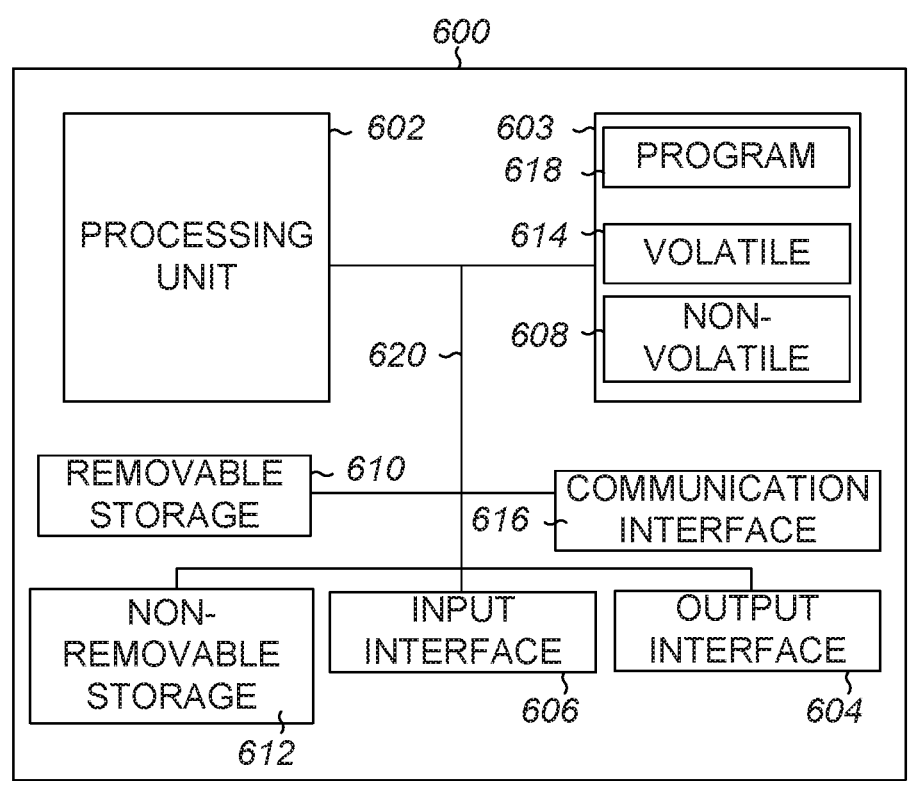
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. One example machine 600 (in the form of a computer) can include a processing unit 602 (e.g., processing circuitry), memory 603, removable storage 610, and non-removable storage 612. Although the example computing device is illustrated and described as machine 600, the computing device may be in different forms in different embodiments. For example, the computing device be part of a VR system headset, smartphone, laptop, desktop, tablet, smartwatch, television, projector, or other computing device including the same or similar elements as illustrated and described regarding FIG. 6. One or more of the methods 200, 300, 400, and 500 or system 100 can be implemented using one or components of the machine 600. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include— or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, a VR display screen, or the like that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

What follows is a description of Examples to help aid understanding of disclosed subject matter:

Example 1 includes a virtual reality (VR) system comprising a memory device including, for each capture point of capture points of a scene, image data, two directly adjacent capture points, and motion vectors for each of the two directly adjacent capture points, and processing circuitry to perform operations for populating a VR display, the operations comprising identifying a point at which a world ray intersects a capture surface defined by the capture points, identifying a capture point closest to the identified point, generating a motion vector based on the motion vectors for each of the two directly adjacent capture points, identifying a vector in the generated motion vector at a location at which the world ray intersects an image surface, and providing a pixel value from the image data of the capture point, the pixel value corresponding to a location in the image surface at which a vector of the generated motion vector points to the location at which the world ray intersects the image surface within a threshold distance.

In Example 2, Example further includes, wherein the memory further includes data identifying a cell and an associated capture point identifying the capture point closest to all points in the cell, and wherein identifying the capture point closest to the identified point includes identifying the cell to which the identified point maps and the associated capture point.

In Example 3, at least one of Examples 1-2 further includes, wherein the motion vectors for the two directly adjacent capture points form an orthogonal basis.

In Example 4, at least one of Examples 1-3 further includes, wherein providing the pixel value from the image data of the capture point includes identifying a second location corresponding to the identified location minus the identified vector.

In Example 5, Example 4 further includes, wherein providing the pixel value from the image data of the capture point further includes identifying a second vector of the generated vectors at the second location.

In Example 6, Example 5 further includes, wherein providing the pixel value from the image data of the capture point further includes determining a difference between the location and a third location to which the second vector points.

In Example 7. Example 6 further includes, wherein providing the pixel value from the image data of the capture point further includes comparing the determined difference to a threshold distance and in response to determining the determined difference is less than the specified threshold returning the pixel of the image data corresponding to the second location.

Example 8 includes a non-transitory machine-readable medium including instructions that, when executed by a machine, cause the machine to perform operations comprising identifying a point at which a world ray intersects a capture surface defined by capture points, identifying a capture point closest to the identified point, generating a motion vector based on motion vectors for each of the two directly adjacent capture points, identifying a vector in the generated motion vector at a location at which the world ray intersects an image surface, and providing a pixel value from the image data of the capture point, the pixel value corresponding to a location in the image surface at which a vector of the generated motion vector points to the location at which the world ray intersects the image surface within a threshold distance.

In Example 9, Example 8 further includes, wherein identifying the capture point closest to the identified point includes identifying a cell to which the identified point maps and the associated capture point.

In Example 10, at least one of Examples 8-9 further includes, wherein the motion vectors for the two directly adjacent capture points form an orthogonal basis.

In Example 11, at least one of Examples 8-10 further includes, wherein providing the pixel value from the image data of the capture point includes identifying a second location corresponding to the identified location minus the identified vector.

In Example 12, Example 11 further includes, wherein providing the pixel value from the image data of the capture point further includes identifying a second vector of the generated vectors at the second location.

In Example 13, Example 12 further includes, wherein providing the pixel value from the image data of the capture point further includes determining a difference between the location and a third location to which the second vector points.

In Example 14, Example 13 further includes, wherein providing the pixel value from the image data of the capture point further includes comparing the determined difference to a threshold distance and in response to determining the determined difference is less than the specified threshold returning the pixel of the image data corresponding to the second location.

Example 15 includes a method for populating a virtual reality (VR) headset display, the method comprising identifying a point at which a world ray intersects a capture surface defined by capture points of a scene, identifying a capture point closest to the identified point, generating a motion vector based on the motion vectors for each of two directly adjacent capture points, identifying a vector in the generated motion vector at a location at which the world ray intersects an image surface, and providing a pixel value from the image data of the capture point, the pixel value corresponding to a location in the image surface at which a vector of the generated motion vector points to the location at which the world ray intersects the image surface within a threshold distance or after a specified number of iterations.

In Example 16, Example 15 further includes, wherein providing the pixel value from the image data of the capture point includes identifying a second location corresponding to the identified location minus the identified vector.

In Example 17, Example 16 further includes, wherein providing the pixel value from the image data of the capture point further includes identifying a second vector of the generated vectors at the second location.

In Example 18, Example 17 further includes, wherein providing the pixel value from the image data of the capture point further includes determining a difference between the location and a third location to which the second vector points.

In Example 19, Example 18 further includes, wherein providing the pixel value from the image data of the capture point further includes comparing the determined difference to a threshold distance and in response to determining the determined difference is less than the specified threshold returning the pixel of the image data corresponding to the second location.

In Example 20, at least one of the Examples 15-19 further includes, wherein identifying the capture point closest to the identified point includes identifying a cell to which the identified point maps and an associated capture point of the cell.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A virtual reality (VR) system comprising:
a memory device including data regarding a scene that is captured from multiple capture points, the data indicating, for each capture point of the capture points of the scene, image data, two directly adjacent capture points to the capture point, offset vectors to the two directly adjacent capture points, and motion vectors for each of the two directly adjacent capture points, the capture points correspond to respective camera locations of an array of cameras that captured the scene; and
processing circuitry to perform operations for populating a VR display, the operations comprising:
identifying a first point at which a world ray intersects a capture surface defined by the capture points;
identifying a capture point of the capture points closest to the first point;
identifying a first vector based on the first point and the capture point;
identifying a first motion vector based on motion vectors from the two directly adjacent capture points
estimating a pixel location in the image data corresponding to the capture point based on a combination of the first vector and the first motion vector; and
obtaining a pixel value from the estimated pixel location in the image data to populate the VR display.

2. The VR system of claim 1, wherein the memory further includes data identifying a cell of a partition of the capture surface and an associated capture point closest to all points in the cell, and wherein identifying the capture point closest to the first point includes identifying the cell to which the first point maps and the associated capture point.

3. The VR system of claim 2 wherein the cell is part of a Voronoi grid based on the capture points.

4. The VR system of claim 1, wherein the motion vectors for the two directly adjacent capture points form an orthogonal basis.

5. The VR system of claim 1, and further comprising:
determining a difference vector between the first point and the estimated pixel location;
updating the first vector by adding the difference vector from the first vector;
comparing the difference vector to a threshold magnitude; and
using the updated first vector as the estimated pixel location in response to the comparing to obtain the pixel value.

6. The VR system of claim 5 and further comprising repeating the elements of claim 5 while updating an iteration counter until the iteration counter reaches an iteration threshold.

7. A non-transitory machine-readable medium including instructions that, when executed by a machine, cause the machine to perform operations comprising:
identifying a first point at which a world ray intersects a capture surface defined by capture points;
identifying a capture point of the capture points closest to the first point;
identifying a first vector based on the first point and the capture point;
identifying a first motion vector based on the motion vectors from the two directly adjacent capture points;
estimating a pixel location in the image data corresponding to the capture point based on a combination of the first vector and the first motion vector; and
obtaining a pixel value from the estimated pixel location in the image data to populate the VR display.

8. The non-transitory machine-readable medium of claim 7, wherein identifying the capture point closest to the first point includes identifying a cell of a partition of the capture surface to which the first point maps.

9. The non-transitory machine-readable medium of claim 7, wherein the motion vectors for the two directly adjacent capture points form an orthogonal basis.

10. A method for populating a virtual reality (VR) headset display, the method comprising:
identifying a first point at which a world ray intersects a capture surface defined by capture points of a scene;
identifying a capture point of the capture points closest to the first point;
identifying a first vector based on the first point and the capture point;
identifying a first motion vector based on the motion vectors from the two directly adjacent capture points;

estimating a pixel location in the image data corresponding to the capture point based on a combination of the first vector and the first motion vector; and obtaining a pixel value from the estimated pixel location in the image data to populate the VR display.

11. The method of claim 10, wherein identifying the capture point closest to the first point includes identifying a cell of a partition of the capture surface to which the first point maps and an associated capture point of the cell.

* * * * *